(12) United States Patent
Kim

(10) Patent No.: US 11,584,271 B2
(45) Date of Patent: Feb. 21, 2023

(54) AIR SUSPENSION APPARATUS FOR VEHICLE SEATS

(71) Applicants: HYUNDAI MOTOR COMPANY, Seoul (KR); KIA CORPORATION, Seoul (KR)

(72) Inventor: Byung Moon Kim, Jeonju-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/357,634

(22) Filed: Jun. 24, 2021

(65) Prior Publication Data

US 2022/0161699 A1 May 26, 2022

(30) Foreign Application Priority Data

Nov. 24, 2020 (KR) .................. 10-2020-0158560

(51) Int. Cl.
*B60N 2/50* (2006.01)
*B60N 2/52* (2006.01)
*B60H 1/34* (2006.01)
*F16H 1/00* (2006.01)

(52) U.S. Cl.
CPC ............ *B60N 2/501* (2013.01); *B60N 2/502* (2013.01); *B60N 2/522* (2013.01); *B60N 2/525* (2013.01); *B60H 1/3421* (2013.01); *B60N 2/506* (2013.01); *B60N 2/508* (2013.01); *F16H 1/00* (2013.01)

(58) Field of Classification Search
CPC .......... B60N 2/50; B60N 2/501; B60N 2/502; B60N 2/506; B60N 2/508; B60N 2/522; B60N 2/525; B60H 1/00; B60H 1/3421; F16H 1/00
See application file for complete search history.

(56) References Cited

U.S. PATENT DOCUMENTS

| | | | | |
|---|---|---|---|---|
| 4,946,145 A | * | 8/1990 | Kurabe | F16F 15/0275 248/564 |
| 2003/0119439 A1 | * | 6/2003 | Lacefield | B60H 1/00842 454/121 |
| 2008/0197684 A1 | * | 8/2008 | Ott | B60N 2/508 297/344.16 |
| 2020/0122612 A1 | * | 4/2020 | Filler | B60N 2/525 |

FOREIGN PATENT DOCUMENTS

| | | | |
|---|---|---|---|
| DE | 102006058441 B3 | * | 4/2008 |
| KR | 20030023956 A | * | 3/2003 |
| KR | 20050065877 A | * | 6/2005 |
| KR | 20050101357 A | * | 10/2005 |
| KR | 20210113888 A | * | 9/2021 |

\* cited by examiner

*Primary Examiner* — Tan Le
(74) *Attorney, Agent, or Firm* — Morgan, Lewis & Bockius LLP

(57) ABSTRACT

An air suspension apparatus for vehicle seats includes an air shutter connected to a supply port of a control valve configured to supply air so as to adjust the opening degree of an inner air channel through which air supplied to the control valve passes.

13 Claims, 8 Drawing Sheets

AIR SUSPENSION APPARATUS FOR VEHICLE SEATS

CROSS-REFERENCE TO RELATED APPLICATION

This application claims the benefit of and the priority to Korean Patent Application No. 10-2020-0158560 filed on Nov. 24, 2020, the entire contents of which are incorporated herein by reference.

TECHNICAL FIELD

The present disclosure relates to an air suspension apparatus for vehicle seats.

BACKGROUND

In general, seats of a vehicle are provided to enable a driver and passengers to sit thereon during the driving time of the vehicle, and various apparatuses are provided so that the driver and the passengers can sit on the seats in as comfortable postures as possible even within the narrow interior of the vehicle.

For example, a large commercial vehicle, such as a bus or a truck, vibrates or moves more loudly than a car during driving, and thus, an air suspension apparatus configured to absorb impact during driving is installed under a driver's seat in the large commercial vehicle.

SUMMARY

The present disclosure provides an air suspension apparatus for vehicle seats which may control air supply to an air spring and air discharge from the air spring, separately when a vehicle is stopped and when the vehicle is driving.

The present disclosure also provides an air suspension apparatus for vehicle seats which may adjust buffering and damping characteristics by controlling air supply to an air spring and air discharge from the air spring depending on driving conditions, such as vehicle speed, road condition, etc.

In one aspect, the present disclosure provides an air suspension apparatus for vehicle seats, including an upper guide and a lower guide mounted under a seat of a vehicle and on a vehicle body provided below the seat, respectively, an X-link mounted such that respective link elements thereof are slidably coupled to the upper guide and the lower guide, and configured to support the upper guide so as to vertically move the upper guide with respect to the lower guide, an air spring installed between one of the upper guide and the lower guide and the X-link, and filled with air to absorb impact applied to the seat so as to support the seat, a control valve connected to the air spring through an air tube so as to supply air to the air spring, and configured to control a movement direction of air so as to enable the air to selectively enter and exit the air spring, an air shutter installed on a supply path of air from the air tank to the control valve, and configured to adjust an opening degree of an inner air channel configured to pass air there through, a driving information detector configured to detect vehicle driving information, and a controller configured to control operation of the air shutter so as to adjust the opening degree of the inner air channel of the air shutter based on the vehicle driving information detected by the driving information detector.

Other aspects and preferred embodiments of the disclosure are discussed infra.

The above and other features of the disclosure are discussed infra.

DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
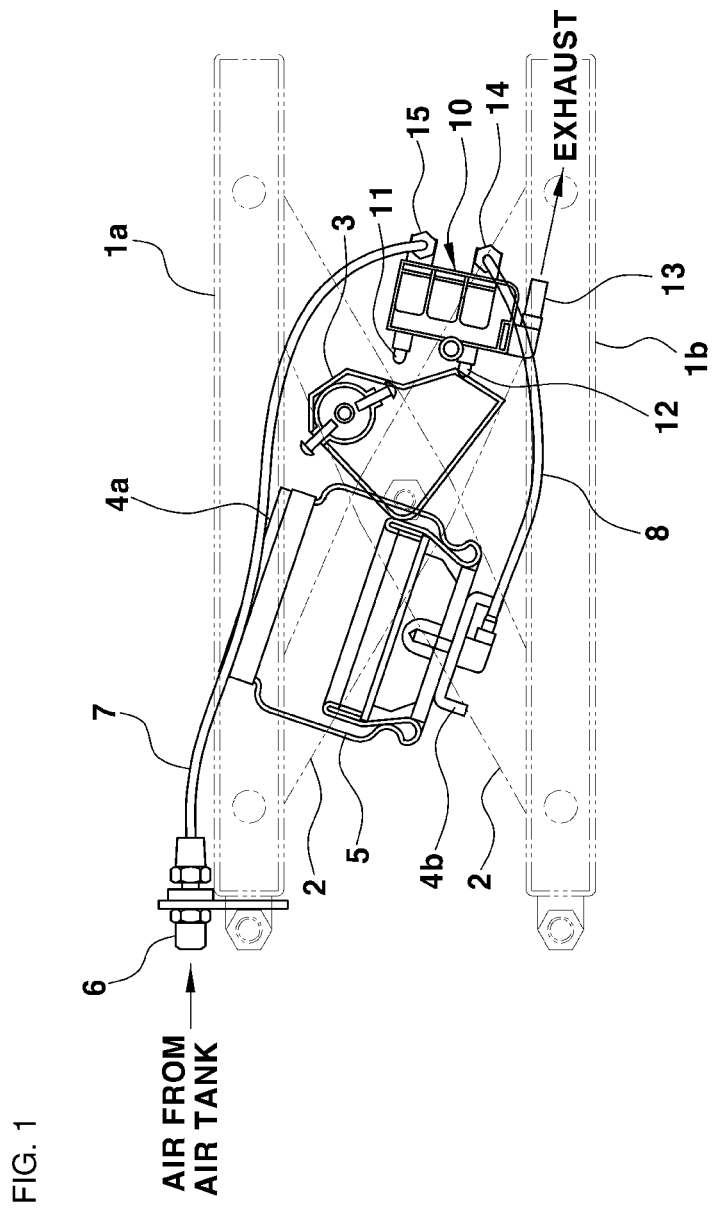
FIG. 1 is a view illustrating one example of well-known air suspension apparatuses.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below. While the present disclosure will be described in conjunction with exemplary embodiments, it will be understood that the present disclosure is not limited to the exemplary embodiments. On the contrary, the present disclosure is intended to cover not only the exemplary embodiments, but also various alternatives, modifications, equivalents and other embodiments, which may be included within the spirit and scope of the present disclosure as defined by the appended claims.

In the following description of the embodiments, terms, such as "comprising", "including", "having", etc., will be interpreted as indicating the presence of characteristics, numbers, steps, operations, elements or parts stated in the description or combinations thereof, and do not exclude the presence of one or more other characteristics, numbers, steps, operations, elements, parts or combinations thereof, or the possibility of adding the same.

The present disclosure provides an air suspension apparatus for vehicle seats which may control air supply to an air spring and air discharge from the air spring, separately when a vehicle is stopped and when the vehicle is driving.

Further, the present disclosure provides an air suspension apparatus for vehicle seats which may control air supply to an air spring and air discharge from the air spring depending on driving conditions, such as vehicle speed, road condition, etc.

In the present disclosure, a vehicle may be a commercial vehicle, such as a truck, and, because the truck frequently travels a long distance due to the characteristics thereof, the performance of the air suspension apparatus has a great effect on the ride comfort of the truck.

However, the well-known suspension apparatus has difficulty satisfying all of different requirements of vertical damping force in respective driving situations, and thus has difficulty providing optimal ride comfort.

For example, the air suspension apparatus requires a high quick down speed when the vehicle is stopped, and needs to gently attenuate road impact while absorbing the road impact when the vehicle is driving.

Therefore, an air suspension apparatus, which may simultaneously improve user convenience and ride comfort by automatically adjusting air supply to an air spring and air discharge (exhaust) from the air spring depending on whether or not the vehicle is stopped or is driving, and driving conditions, such as vehicle speed, road condition, etc., is disclosed.

FIG. 1 is a view illustrating one example of well-known suspension apparatuses.

As shown in this figure, the air suspension apparatus for absorbing impact applied to a seat includes a pair of guides 1a and 1b mounted under a seat (not shown) and on a vehicle body (not shown) below the seat in parallel, and an X-link 2 mounted between the guides 1a and 1b so as to be slidable.

Here, the X-link 2 mounted on the lower guide 1b fixed to a vehicle body floor supports the upper guide 1a so as to vertically move the upper guide 1a and, in this case, ends of respective link elements forming the X-link 2 are coupled to the upper guide 1a and the lower guide 1b so as to be slidable.

Further, an air spring 5, which is supported by separate brackets 4a and 4b, is installed between the upper guide 1a and the X-link 2, and the air spring 5 is configured such that air supplied from an air tank (not shown) is injected into the air spring 5 through air tubes 7 and 8 and a control valve 10.

The air spring 5 is configured such that air selectively enters and exits the air spring 5 through the control valve 10, and supports the seat through the X-link 2 and the guide 1a so as to absorb impact applied to the seat.

Here, the control valve 10 controls the movement direction of air so as to enable the air to selectively enter and exit the air spring 5 in the state in which the control valve 10 is connected to the air spring 5.

Figure 2:
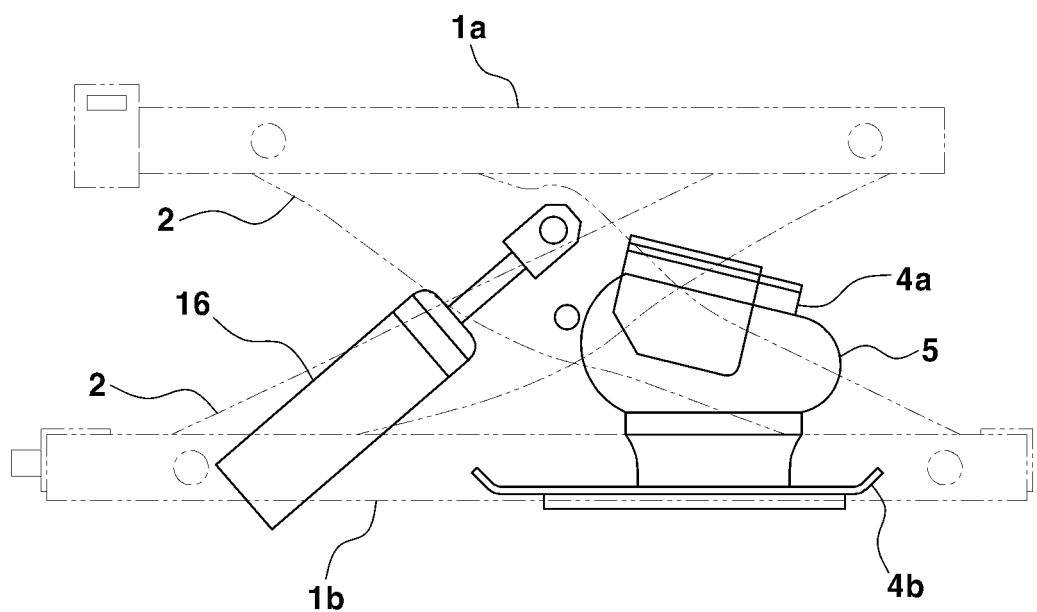
FIG. 2 is a view illustrating another example of well-known air suspension apparatuses.

Although FIG. 1 illustrates an example in which the air spring 5 is installed between the upper guide 1a and the X-link 2, the air spring 5 may be installed between the X-link 2 and the lower guide 1b (or a lower frame of the air suspension apparatus or the vehicle body floor), as shown in FIG. 2.

Reference numeral 16 in FIG. 2 indicates a damper installed between the vehicle body and the X-link 2.

In such an air suspension apparatus, when the seat is moved downwards, a cam 2 is rotated in a designated direction to press a supply switch pin 11 of the control valve 10, and thus, air in an air tank is injected into the air spring 5 sequentially via an air inlet 6, the air tube 7, the control valve 10 and the air tube 8, thereby moving the seat upwards again.

Further, when the seat is moved upwards, the cam 3 is rotated in the opposite direction to press an exhaust switch pin 12 of the control valve 10, and thus, air in the air spring 5 is discharged to the atmosphere sequentially via the air tube 8, the control valve 10 and an exhaust port 13, thereby moving the seat downwards to an original reference height again.

Figure 3:
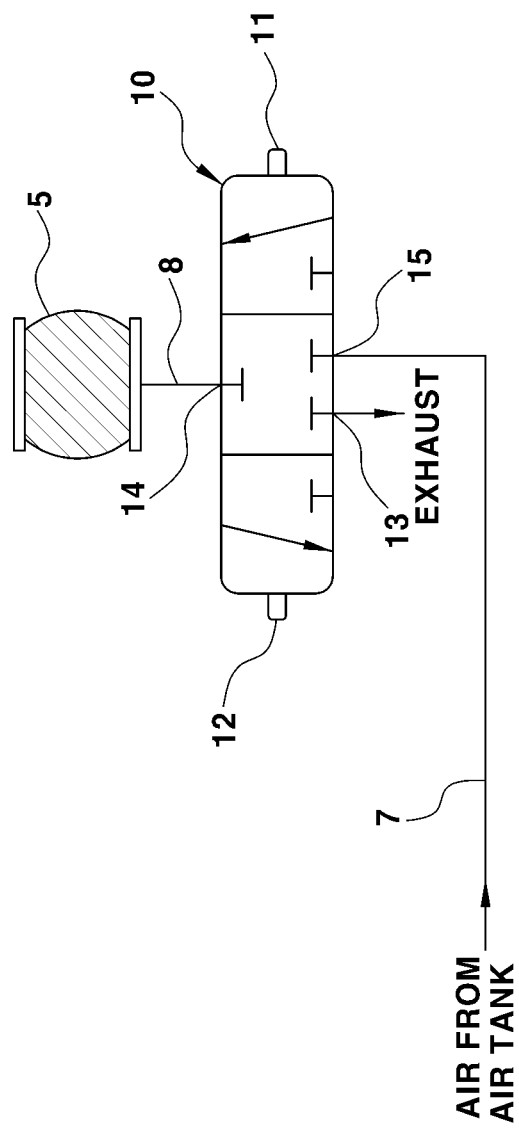
FIG. 3 is a diagram illustrating the pneumatic circuit of the well-known air suspension apparatus.

FIG. 3 is a circuit diagram illustrating air flow control by the control valve and air paths formed by the air flow control in the air suspension apparatus of FIG. 1.

In the example of FIG. 1, when the cam 3 is rotated in the designated direction to press the supply switch pin 11 of the control valve 10, the control valve 10 is switched to an air supply phase, and thus, air in the air tank is injected into the air spring 5 via a connection port 14 of the control valve 10.

In contrast, when the cam 3 is rotated in the opposite direction to press the exhaust switch pin 12 of the control valve 10, the control valve 10 is switched to an air exhaust phase, and thus, air in the air spring 5 is discharged to the atmosphere via the exhaust port 13 of the control valve 10.

In an air suspension apparatus provided in a seat of a large commercial vehicle, such as a truck, if a driver operates a quick down switch is operated when the driver gets into or out of the vehicle after the vehicle is stopped, a quick down operation, in which air in the air spring 5 is discharged through the control valve 10 and thus the height of the seat is lowered, is performed.

In this air suspension apparatus, as the diameters of air supply and discharge paths, i.e., the air tube 7 between the air inlet 6 and the control valve 10 and the air tube 8 between the control valve 10 and the air spring 5, are increased, air may be rapidly supplied into the air spring 5 and air in the air spring 5 may be rapidly discharged to the atmosphere.

Particularly, as the diameter of the air tube 8 is increased, air in the air spring 5 may be rapidly discharged to the atmosphere so that rapid air exhaust may be conducted, the height of the seat may be rapidly lowered due to an increase in air exhaust, and thus the driver may conveniently get into or out of the vehicle.

On the other hand, during driving, as the diameter of the air tube 8 is decreased, the exhaust speed of air from the air spring may be lowered, air exhaust may be decreased, and thus ride comfort experienced by the driver may be improved.

Therefore, it is necessary to adjust the air discharge amount and the air discharge speed from the air spring 5 separately in the situation in which the quick down operation is performed and the situation in which the vehicle is driving and, in order to exhibit the optimal buffering action and function during driving, adjustment of the air discharge speed depending on the driving conditions of the vehicle or road condition is required.

Figure 4:
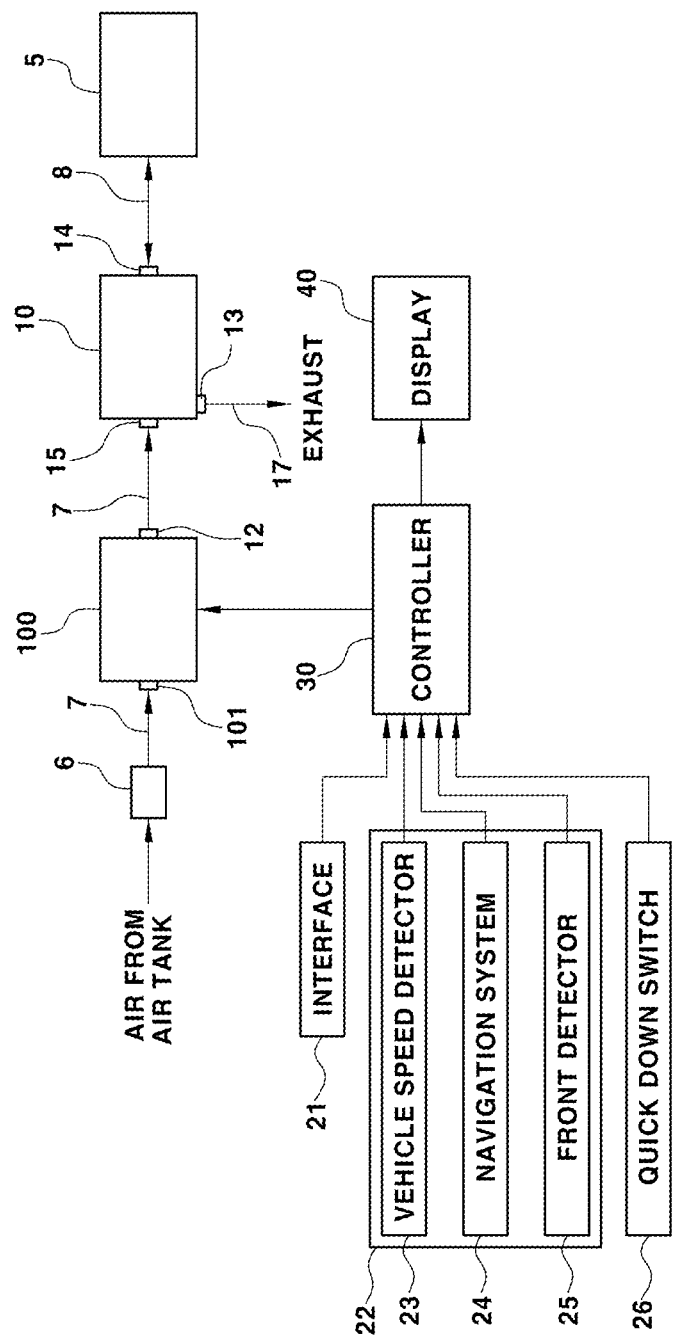
FIG. 4 is a block diagram illustrating the overall configuration of an air suspension apparatus in one form of the present disclosure.

FIG. 4 is a block diagram illustrating the overall configuration of an air suspension apparatus in some forms of the present disclosure, and also illustrating air paths for operating the air suspension apparatus together with the configuration thereof.

In the air suspension apparatus in some forms of the present disclosure, an upper guide, a lower guide and an X-link installed to connect the upper and lower guides are the same as those of the well-known suspension apparatuses, as shown in FIGS. 1 to 3.

Further, in the air suspension apparatus in some forms of the present disclosure, the configurations and the installation structures of an air spring and a control valve are the same as those of the well-known suspension apparatuses, as shown in FIGS. 1 to 3.

That is, referring to FIG. 1, the air suspension apparatus in some forms of the present disclosure includes a pair of guides 1a and 1b mounted under a seat cushion (not shown) and on a vehicle body (not shown) provided therebelow in parallel, and an X-link 2 mounted between the guides 1a and 1b so as to be slidable.

Here, the X-link 2 mounted on the lower guide 1b fixed to a vehicle body floor supports the upper guide 1a so as to vertically move the upper guide 1a and, in this case, ends of respective link elements forming the X-link 2 are coupled to the upper guide 1a and the lower guide 1b so as to be slidable.

Further, an air spring 5, which is supported by separate brackets 4a and 4b, is installed between the upper guide 1a and the X-link 2, and the air spring 5 is configured such that air supplied from an air tank (not shown) is injected into the air spring 5 through air tubes 7 and 8 and a control valve 10.

The air spring 5 is configured such that air selectively enters and exits the air spring 5 through the control valve 10, and supports the seat through the X-link 2 and the guide 1a so as to absorb impact applied to the seat in the state in which the air spring 5 is filled with air.

Although FIG. 1 illustrates an example in which the air spring 5 is installed between the upper guide 1a and the X-link 2, the air spring 5 may be installed between the X-link 2 and the lower guide 1b (or a lower frame of the air suspension apparatus or the vehicle body floor), as shown in FIG. 2.

Further, the air tubes 7 and 8 are provided respectively between an air inlet 6 and the control valve 10 and between the control valve 10 and the air spring 5, and thus, air supplied through the air inlet 6 is supplied to a supply port 15 of the control valve 10 through the air tube 7.

Further, air having passed through the control valve 10 is supplied to the air spring 5 from the connection port 14 of the control valve 10 via the air tube 8, or, in contrast, air discharged from the air spring 5 is moved to the control valve 10 via the air tube 8.

Such a configuration is the same as the configurations shown in FIGS. 1 to 3 but, in some forms of the present disclosure, as shown in FIG. 4, an air shutter 100 configured to adjust the size of the flow cross-sectional area of an inner air channel on an air path between the air inlet 6 and the control valve 10 may be additionally installed.

That is, the air suspension apparatus in some forms of the present disclosure further includes the air shutter 100 configured to adjust the size of the flow cross-sectional area of the inner air channel thereof, and the configuration of the air shutter 100 will be described below in more detail.

In the following description, the size of the flow cross-sectional area of the inner air channel of the air shutter 100 will be referred to as an 'opening degree' of the air shutter 100 or the inner air channel thereof.

Further, the air suspension apparatus in some forms of the present disclosure is configured to automatically adjust air supply to and air discharge from the air spring 5 (for example, an air supply amount, an air exhaust amount, a time taken to discharge air, etc.) so as to provide the optimal buffering performance depending on the vehicle driving information, i.e., whether or not the vehicle is stopped or is driving, and driving conditions, such as vehicle speed, road condition, etc.

For this purpose, the air suspension apparatus in some forms of the present disclosure further includes, in addition to the above-described air shutter 100, a driving information detector 22 configured to detect vehicle driving information, and a controller 30 configured to control driving of the air shutter 100 based on the vehicle driving information detected by the driving information detector 22.

In addition, the air suspension apparatus in some forms of the present disclosure may further include an interface 21 operated by a driver so as to selectively input one of turning-on and turning-off of a seat suspension control function to vary the suspension characteristics of the seat depending on the vehicle driving information through control of driving of the air shutter 100.

The interface 21 may employ any unit through which the driver may turn on and off the seat suspension control function in the vehicle and, for example, may be an operation device, such as a button or a switch provided in the vehicle, an input device of an audio, video and navigation (AVN) system, or a touchscreen.

Moreover, the air suspension apparatus in some forms of the present disclosure may further include a display 40 configured to display information about a seat suspension control situation, and the display 40 may be a glass monitor configured to display information through the windshield glass of the vehicle.

In some forms of the present disclosure, the controller 30 may recognize the turning-on or turning-off state of the seat suspension control function from a signal input from the interface 21, and control operation of the display 40 so as to display the information about the seat suspension control situation depending on the driving state of the air shutter 100.

Further, in some forms of the present disclosure, the vehicle driving information may include the current driving speed of the vehicle and road condition information, and the driving information detector 22 may include a vehicle speed detector 23 configured to detect the vehicle speed, and a road information provider configured to provide the road condition information.

Here, the vehicle speed detector 23 may serve to detect the vehicle speed, include wheel speed sensors installed at wheels of the vehicle, and determine the current vehicle speed based on signals from the wheel speed sensors.

The road information provider may include a navigation system 24 installed in the vehicle so as to provide the road condition information, and a front detector 25 installed in the vehicle so as to detect information about a preceding vehicle, i.e., a vehicle driving in front of the vehicle.

In some forms of the present disclosure, the front detector 25 may be a general radar installed in the vehicle.

In some forms of the present disclosure, the controller 30 may receive the road condition information, such as the kind of a road on which the vehicle is currently driving, for example, whether or not the road is a flat road (paved road) or a rough road (unpaved road), provided by the navigation system 24.

Further, the controller 30 may acquire a distance from a preceding vehicle, traffic information of the road on which the vehicle is currently driving, etc., from the information about the preceding vehicle detected by the front detector 25.

The controller 30 in some forms of the present disclosure receives signals from the vehicle speed detector 23 and the road information provider 24 and 25 and controls driving of the air shutter 100 based on the vehicle driving information acquired thereby, i.e., the vehicle speed and the road condition information, thereby controlling the suspension characteristics of the seat depending on the vehicle driving information (whether or not the vehicle is stopped or is driving and the driving conditions).

In some forms of the present disclosure, when the suspension characteristics of the seat are adjusted, ride comfort experienced by the driver seated on the seat may be adjusted.

The air shutter 100 in some forms of the present disclosure is provided such that driving thereof is controlled based on a control signal output from the controller 30, and particularly, is connected to the supply port 15 of the control valve 10 to which air from the air tank is supplied.

That is, as shown in FIG. 4, an outlet port 102 of the air shutter 100 is connected to an inlet port, i.e., the supply port 15, of the control valve 10, and an inlet port 101 of the air shutter 100 is connected to the air tube 7 connected to the air inlet 6.

Thereby, air, which is supplied from the air tank to the air inlet 6 and flows along the air tube 7, passes through the air shutter 100 and is then supplied to the control valve 10, and the air shutter 100 is disposed at the front end of the control valve 10, i.e., the inlet (the upstream portion) of the control valve 10, in the above-described air paths and is configured to vary the opening degree of the inner air channel depending on the control signal output from the controller 30.

Figure 5:
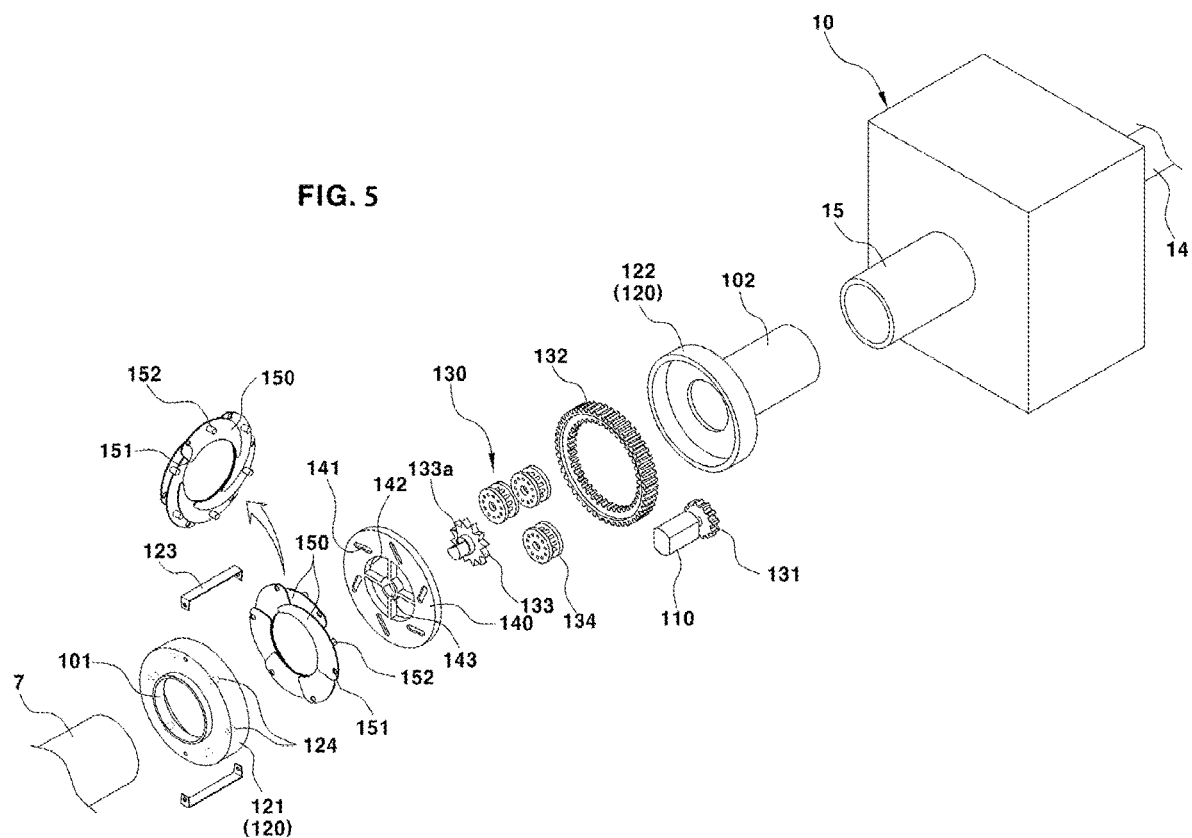
FIG. 5 is an exploded perspective view of an air shutter of the air suspension apparatus in one form of the present disclosure.
Figure 6:
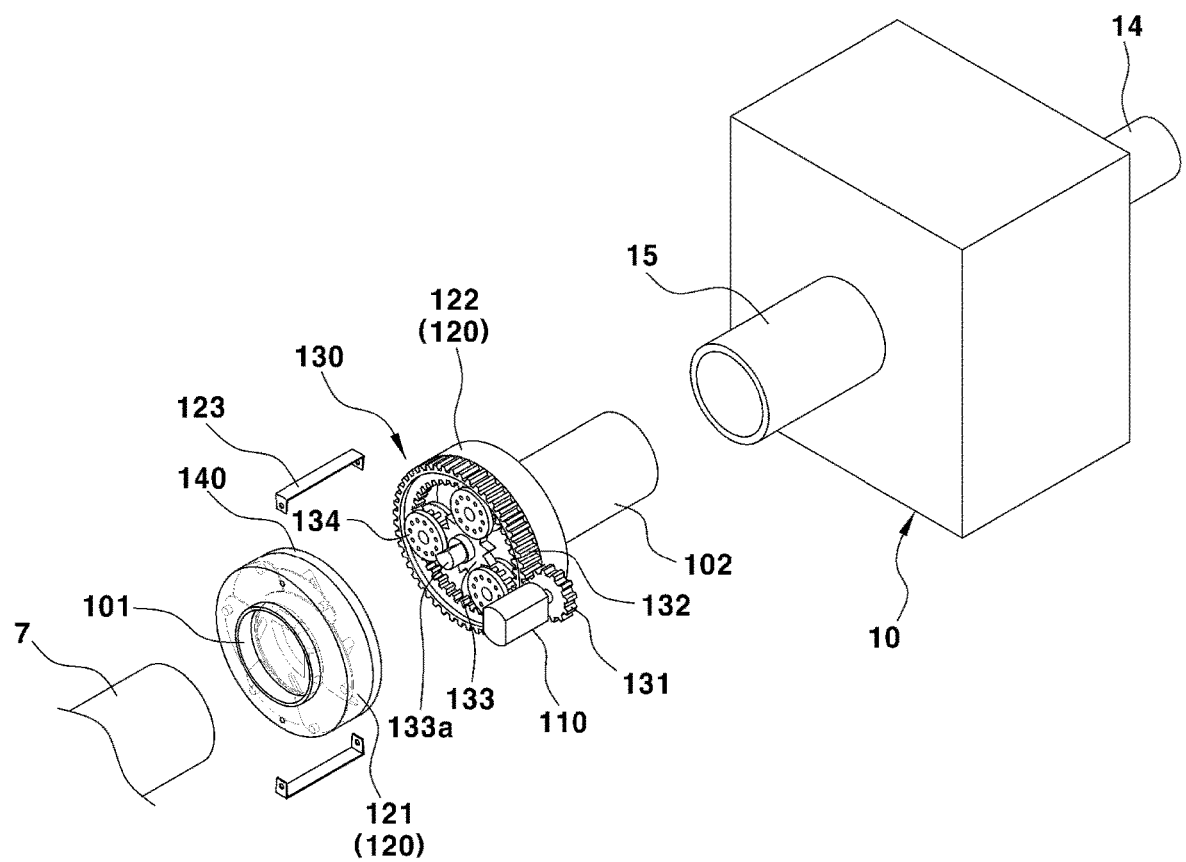
FIG. 6 is an exploded perspective view illustrating assembly of some elements of the air shutter of the air suspension apparatus in one form of the present disclosure.
Figure 7:
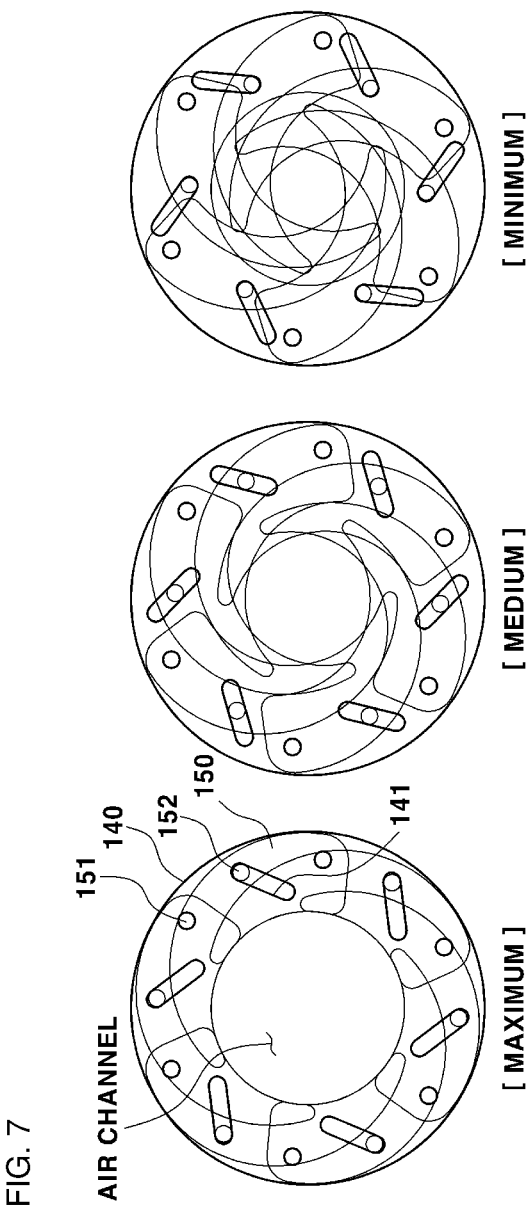
FIG. 7 is a view illustrating adjustment of the opening degree of the air shutter of the air suspension apparatus in one form of the present disclosure.

FIG. 5 is an exploded perspective view of the air shutter of the air suspension apparatus in some forms of the present disclosure, FIG. 6 is an exploded perspective view illustrating assembly of some elements of the air shutter of the air suspension apparatus in some forms of the present disclosure, and FIG. 7 is a view illustrating adjustment of the opening degree of the air shutter of the air suspension apparatus in some forms of the present disclosure.

In some forms of the present disclosure, the air shutter 100 may have a configuration similar to that of a well-known iris mounted in a camera, and the air shutter 100 adjusts the amount of air by controlling the opening degree of the inner air channel, through which the air passes, in a similar manner to adjustment of amount of light by adjusting the size of a channel, through which the light passes, by controlling the operation of the iris of the camera.

The air shutter 100 may adjust the amount of air supplied to the supply port 15 of the control valve 10 via the air tube 7 from the air inlet 6 by varying the opening degree of the inner air channel, and adjust the amounts of air in air channels and spaces after the air shutter 100 (i.e., in the downstream portion), i.e., within the control valve 10, the air tube 8 and the air spring 5.

In some forms of the present disclosure, air tubes having a diameter capable of supplying the maximum amount of air necessary to operate the air suspension apparatus may be used as the air tubes 7 and 8, and in this case, the air shutter 100 may vary the amount of air supplied to the control valve 10 within a range equal to or less than the maximum amount of air by varying the opening degree of the inner air channel.

That is, when the opening degree of the inner air channel of the air shutter 100 reaches the maximum opening degree, the diameter or the flow cross-sectional area of the inner air channel of the air shutter 100 becomes equal to or less than the diameter or the flow cross-sectional area of the air tubes 7 and 8, and the air shutter 100 may be driven so that the flow cross-sectional area (opening degree) of the inner air channel thereof is adjusted within a range equal to or less than the flow cross-sectional area of the air tubes 7 and 8.

Thereby, the amounts of air in the air channels and the spaces after the air shutter 100, i.e., within the control valve 10, the air tube 8 and the air spring 5, may be adjusted within the range equal to or less than the maximum amount of air necessary to operate the air suspension apparatus, and particularly, the amount of air discharged from the air spring 5 to the atmosphere through the exhaust port 13 of the control valve 10 may also be adjusted.

When the amount of air supplied to the control valve 10 through the air shutter 100 is adjusted, the amounts of air in the control valve 10, the air tube 8 and the air spring 5 may also be adjusted, and particularly, the amount of air discharged from the air spring 5 to the atmosphere through the exhaust port 13 of the control valve 10 may also be adjusted.

As such, when the amount of air discharged to the atmosphere is adjusted, the suspension characteristics of the seat, i.e., the buffering and damping characteristics of the seat, may be varied.

In some forms of the present disclosure, the air shutter 100 includes the inner air channel through which air supplied to the control valve 10 passes, movable members configured to vary the opening degree of the inner air channel, and an actuator configured to operate the movable members based on a control signal from the controller 30.

In more detail, in some forms of the present disclosure, the air shutter 100 includes a motor 110 configured such that driving and the rotation direction thereof are controlled based on a control signal output from the controller 30, a stationary body 120 installed to connect air channels between the air tube 7 and the supply port 15 of the control valve 10, a reducer 30 installed on the stationary body 120 so as to reduce the rotary force of the motor 110 and then to transmit the reduced rotary force, a rotary plate 140 rotatably installed on the stationary body 120 so as to be rotated by the reduced rotary force transmitted from the reducer 30, and a plurality of blades 150 serving as the movable members, rotatably installed in the stationary body 120 so as to form an air channel within the stationary body 120, and rotated simultaneously due to rotation of the rotary plate 140 so as to adjust the opening degree of the air channel.

As shown in FIGS. 5 and 6, an outer gear 131 is mounted on a drive shaft of the motor 110, and the reducer 130 may include the outer gear 131 and thus have the configuration of a gear device which receives the rotary force of the motor 110 from the outer gear 131, reduces the rotary force and then outputs the reduced rotary force.

For example, the reducer 130 may further include, in addition to the outer gear 131, a gear unit configured to reduce the rotary force of the outer gear 131 and then transmit the reduced rotary force to the rotary plate 140.

Here, the gear unit includes a ring gear 132 configured such that the outer gear 131 is circumscribed thereabout, a central gear 133 disposed at the inner center of the ring gear 132 and combined integrally with the rotary plate 140, and a plurality of pinions 134 inscribed in the ring gear 132, circumscribed about the central gear 133, and revolving around the central gear 133 when the ring gear 132 is rotated.

Here, a central shaft 133a of the central gear 133 is combined integrally with the center of the rotary plate 140, and thereby, the central gear 133 and the rotary plate 140 may be rotated integrally.

Therefore, when the motor 110 is driven, the outer gear 131 is rotated and thus the ring gear 132 is rotated, and when the ring gear 132 is rotated, the pinions 134 are moved integrally with the rotation of the ring gear 132 and thus revolve around the central gear 133.

Here, the central gear 133 engaged with the pinions 134 is rotated, the rotary force of the central gear 133 is transmitted to the rotary plate 140, and thereby, the rotary plate 140 may be rotated.

Consequently, as the rotary force of the motor 110 is transmitted from the outer gear 131 to the ring gear 132, the rotary force is reduced, and the reduced rotary force is transmitted to the rotary plate 140 through the pinions 134, rotated integrally with the ring gear 132, and the central gear 133, thus being capable of rotating the rotary plate 140.

The stationary body 120 is installed on the supply path of air supplied from the outside to the control valve 10, and includes an inlet-side body 121 having the inlet port 101 and an outlet-side body 122 having the outlet port 102, and the blades 150, the rotary plate 140 and the reducer 130 are disposed in a space between the inlet-side body 121 and the outlet-side body 122.

The inlet-side body 121 and the outlet-side body 122 are combined integrally with each other by a connection bracket 123, one end of the air tube 7 is connected to the inlet port 101 of the inlet-side body 12, and the air inlet 6 is connected to the other end of the air tube 7 (with reference to FIG. 4).

The outlet port 102 of the outlet-side body 122 is connected to the supply port 15 of the control valve 10, and thereby, when air in the air tank is supplied to the air tube 7 through the air inlet 6, the air moves along the air tube 7, passes through the air shutter 100, is supplied to the control valve 10 from the air shutter 100, and is supplied to the air spring 5 via the air tube 8.

Further, when air is discharged from the air spring 5, the air is moved from the air spring 5 to the control valve 10 via the air tube 8 and is then discharged to the atmosphere via an exhaust tube 17 connected to the exhaust port 13 of the control valve.

The blades 150 are combined with the inner surface of the inlet-side body 121, and particularly, the blades 150 are disposed in the circumferential direction of the inlet-side body 121 on the inner surface thereof. Here, the respective blades 150 are hinged to the inner surface of the inlet-side body 121 so as to be rotatable.

For this purpose, a hinge hole 151 is formed in in each of the blades 150, and a plurality of hinge pines 124, which is inserted into the hinge holes 151 of the respective blades 150 so as to combine the blades 150 with the inlet-side body 121, is fixedly installed on the inner surface of the inlet-side body 121.

Thereby, when the blades 150 are combined with the inner surface of the inlet-side body 121 by inserting the respective hinge pins 124 of the inlet-side body 121 into the hinge holes 151 of the corresponding blades 150, the respective blades 150 are rotatable about the corresponding hinge pins 124 of the inlet-side body 121.

Further, a connection pin 152 is installed on each of the blades 150, and the connection pins 152 of the respective blades 150 are inserted into slot holes 141 having a predetermined length formed in the rotary plate 140.

In addition to the slot holes 141 configured to guide the connection pins 152 of the respective blades 150, inserted thereinto, air passage holes 142 configured to pass air are also formed through the rotary plate 140.

A shaft coupling hole 143 is formed in the center of the rotary plate 140, and the central shaft 133a of the central gear 133 is inserted into the shaft coupling hole 143 so that the rotary plate 140 is rotated integrally with the central gear 133.

Thereby, as the reduced rotary force of the motor 110 output from the reducer 130 is transmitted to the rotary plate 140, the rotary plate 140 is rotated, and in this case, the respective blades 150 connected to the inlet-side body 121 by the connection pins 152 and the slot holes 141 may be rotated about the corresponding hinge pins 124 of the inlet-side body 121.

When the rotary plate 140 is rotated, a plurality of blades 150 may be simultaneously rotated about the corresponding hinge pins 154 while the connection pins 152 of the respective blades 150 are guided along the corresponding slot holes 141 of the rotary plate 140.

In the air shutter 100, in the state in which the blades 150 are arranged in a circular shape in the circumferential direction on the inner surface of the inlet-side body 121 of the stationary body 120, an air channel configured to pass air is formed at the center of the circular arrangement of the blades 150, and this channel serves as the inner air channel of the air shutter 100, through which air passes.

The size of the air channel formed at the center of the circular arrangement of the blades 150 in the circumferential direction of the inlet-side body 12 is decreased or increased when the blades 150 are operated simultaneously, as shown in FIG. 7. In more detail, when the respective blades 150 are simultaneously rotated inwards, i.e., towards the center of the circular arrangement of the blades 150, about the corresponding hinge pins 124, the size of the air channel formed at the center of the circular arrangement of the blades 150 is decreased.

In this case, the opening degree of the inner air channel of the air shutter 100, through which air passes, is decreased.

On the other hand, when the respective blades 150 are simultaneously rotated outwards about the corresponding hinge pins 124, the size of the air channel formed at the center of the circular arrangement of the blades 150 is increased, and then, the opening degree of the inner air channel of the air shutter 100, through which air passes, is increased.

Here, because the rotation direction of the rotary plate 140 is determined depending on the rotation direction of the motor 110 and the rotation direction of the blades 150 is determined depending on the rotation direction of the rotary plate 140, when the motor 110 is rotated in a regular direction, the rotary plate 140 is also rotated in the regular direction, all the blades 150 are rotated inwards, i.e., towards the center of the circular arrangement of the blades 150, and the opening degree of the inner air channel formed by the blades 150 is decreased.

On the other hand, when the motor 110 is rotated in the opposite direction, the rotary plate 140 is also rotated in the opposite direction, all the blades 150 are rotated outwards, and the opening degree of the inner air channel formed by the blades 150 is increased.

As such, depending on the driving direction of the motor 110, the blades 150 are operated in a direction to decrease the opening degree of the inner air channel of the air shutter 100, through which air passes, or the blades 150 are operated in a direction to increase the opening degree of the inner air channel.

Figure 8:
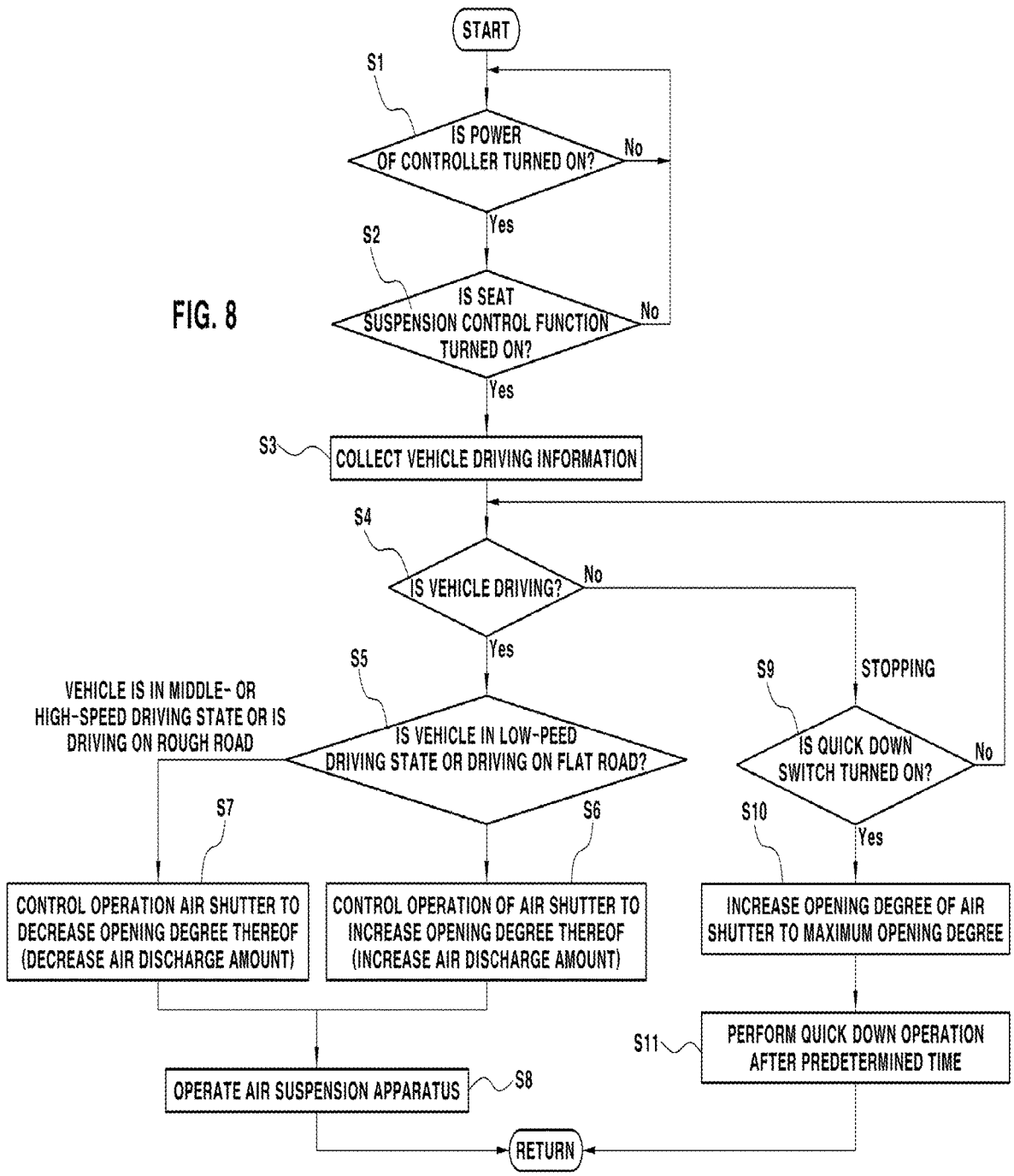
FIG. 8 is a flowchart showing a process for operating and controlling air suspension apparatus in one form of the present disclosure.

FIG. 8 is a flowchart showing a process for performing the seat suspension control function performed by the air suspension apparatus in some forms of the present disclosure.

First, when the power of the controller 30 is turned on (S1) and a driver turns on the seat suspension control function through the interface 121 (S2), the controller 30 starts the process for performing the seat suspension control function.

When the process for performing the seat suspension control function is started, the controller 30 receives vehicle driving information, which is collected by the vehicle (S3).

Thereafter, the controller 30 determines whether or not the vehicle is driving or is stopped (S4), and, upon determining that the vehicle is driving, determines the driving conditions of the vehicle based on the vehicle driving information detected by the driving information detector 22, in more detail, a current vehicle speed detected by the vehicle speed detector 23 and road condition information provided by the road information provider 24 and 25.

First, upon determining that the vehicle is in a low-speed driving state in which the current vehicle speed is equal to or less than a predetermined speed or a road on which the vehicle is currently driving is a flat road from the road condition information (S5), the controller 30 controls the operation of the air shutter 100 so as to increase the opening degree of the inner air channel (S6).

Thereby, during operation of the air suspension apparatus (S8), the amount of air supplied through the control valve 10 and the mounts of air in the air tube 8 and the air spring 5 are increased, and the amount of air discharged to the atmosphere through the exhaust port 13 of the control valve 10 and the exhaust tube 17 when air is discharged from the air spring 5 is increased.

That is, the inflow and outflow rates of air into and from the air spring 5 are increased.

Further, when a distance from a preceding vehicle detected by the front detector 25 is equal to or less than a predetermined distance, the controller 30 may control the operation of the air shutter 100 so as to increase the opening degree of the inner air channel (S6).

On the other hand, upon determining that the vehicle is in a middle- or high-speed driving state in which the current vehicle speed exceeds the predetermined speed or the road on which the vehicle is currently driving is a rough road from the road condition information (S5), the controller 30 controls the operation of the air shutter 100 so as to decrease the opening degree of the inner air channel (S7).

Thereby, during operation of an air suspension apparatus (S8), the amount of air supplied through the control valve 10 and the mounts of air in the air tube 8 and the air spring 5 are decreased, and the amount of air discharged to the atmosphere through the exhaust port 13 of the control valve 10 and the exhaust tube 17 when air is discharged from the air spring 5 is decreased.

That is, the inflow and outflow rates of air into and from the air spring 5 are decreased.

In summary, as described above, upon determining that the vehicle is in the low-speed driving state or the road on which the vehicle is currently driving is a flat road from the road condition information, the controller 30 controls the operation of the air shutter 100 so that the opening degree of the inner air channel reaches a first predetermined opening degree, and, upon determining that the vehicle is in the middle- or high-speed driving state or the road on which the vehicle is currently driving is a rough road from the road condition information, the controller 30 controls the operation of the air shutter 100 so that the opening degree of the inner air channel reaches a second predetermined opening degree set to a value less than the first predetermined opening degree.

Further, when the distance from the preceding vehicle detected by the front detector 25 exceeds the predetermined distance, the controller 30 may control the operation of the air shutter 100 so as to decrease the opening degree of the inner air channel (S7).

As such, if distance information from a preceding vehicle is used, when the distance from the preceding vehicle is equal to or less than the predetermined distance, the controller 30 controls the operation of the air shutter 100 so that the opening degree of the inner air channel reaches a first predetermined opening degree, and, when the distance from the preceding vehicle exceeds the predetermined distance, the controller 30 controls the operation of the air shutter 100 so that the opening degree of the inner air channel reaches a second predetermined opening degree set to a value less than the first predetermined opening degree.

Upon determining that the vehicle is stopped based on the current vehicle speed detected by the vehicle speed detector 23, the controller 30 monitors whether or not a quick down switch 26 (in FIG. 4) is turned on (S9).

When it is detected that the quick down switch 26 is turned on in the stopped state of the vehicle, the controller 30 controls the operation of the air shutter 100 so as to increase the opening degree of the inner air channel to the maximum opening degree (S10).

Thereafter, after a predetermined time (for example, 1 minute) has elapsed, the controller 30 outputs a control signal to discharge air from the air spring 5 to the control valve 10, and then, the quick down operation in which the control valve 10 discharges air from the air spring 5 through the exhaust port 13 is performed (S11).

Consequently, the seat is quickly moved downwards so that the height of the seat may be rapidly lowered, and thus, the driver may conveniently get into or out of the vehicle.

In more detail, in order to cause air of a pressure of 10 bar to flow into the control valve 10 from the air tank, the air is discharged to the air tube 7, the air shutter 100, the control valve 10 and the exhaust tube 17, and in this case, the pressure of the air finally discharged to the atmosphere through the exhaust tube 17 becomes 10 bar regardless of the opening degree of the air shutter 100.

In some forms of the present disclosure, the air shutter 100 serves to adjust the flow rate of air by changing the inner diameter of the air shutter 100, i.e., the opening degree of the air shutter 100, through the blades 150.

Here, because the damping force of the air suspension apparatus may vary according to the opening degree of the air shutter 100 and the velocity of air passing through the control valve 10, when the vehicle is stopped, the opening degree of the sir shutter 100 reaches the maximum opening degree, air flow becomes fast, the quick down speed is increased, and thus the driver may conveniently get into or out of the vehicle, and whereas, when the vehicle is driving, the discharge velocity of air is adjusted depending on the road condition and the vehicle speed, and thus ride comfort through the air suspension apparatus may be improved.

As described above, the air suspension apparatus for vehicle seats in some forms of the present disclosure may control air supply to the air spring and air discharge from the air spring depending on whether or not the vehicle is stopped or is driving, and driving conditions, such as vehicle speed, road condition, etc., and thereby, simultaneously improve convenience in use and ride comfort.

In particular, the air suspension apparatus for vehicle seats in some forms of the present disclosure may automatically adjust the flow rate of air in consideration of different requirements of the vertical damping force of a seat suspension in respective driving situations, thereby being capable of providing optimal buffering and damping performances in the respective driving situations.

As is apparent from the above description, the present disclosure provides an air suspension apparatus for vehicle seats which may control air supply to an air spring and air discharge from the air spring depending on whether or not a vehicle is stopped or is driving, and driving conditions, such as vehicle speed, road condition, etc., thereby being capable of simultaneously improving convenience in use and ride comfort.

In particular, the air suspension apparatus for vehicle seats in some forms of the present disclosure may automatically adjust the flow rate of air in consideration of different requirements of the vertical damping force of a seat suspension in respective driving situations, thereby being capable of providing optimal buffering and damping performances in the respective driving situations.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

What is claimed is:

1. An air suspension apparatus for vehicle seats, comprising:
    an upper guide and a lower guide mounted under a seat of a vehicle and on a vehicle body provided below the seat, respectively;
    an X-link mounted to couple respective link elements of the X-link slidably to the upper guide and the lower guide, and configured to support the upper guide to vertically move the upper guide with respect to the lower guide;
    an air spring installed between one of the upper guide or the lower guide and the X-link, the air spring filled with air to absorb impact applied to the seat to support the seat;
    a control valve connected to the air spring through an air tube to supply air to the air spring, and configured to control a movement direction of air to selectively enter and exit the air spring;
    an air shutter installed on a supply path of air from an air tank to the control valve, and configured to adjust an opening degree of an inner air channel of the air shutter to pass air;
    a driving information detector configured to detect vehicle driving information, the driving information comprising a current vehicle speed, road condition information representing a road on which the vehicle is currently driving, and information on whether or not the vehicle is stopped or is driving; and
    a controller configured to control the air shutter to adjust the opening degree of the inner air channel based on the vehicle driving information, the opening degree of the inner air channel being a size of a flow cross-sectional area of the inner air channel of the air shutter, and the air shutter being configured to adjust the size of the flow cross-sectional area of the inner air channel in response to a control signal output from the controller.

2. The air suspension apparatus of claim 1, further comprising:
    an interface configured to allow a driver to select one of turning-on or turning-off of a seat suspension control function,
    wherein, when the turning-on of the seat suspension control function is selected, the controller is configured to control the air shutter to adjust the opening degree of the inner air channel based on the vehicle driving information.

3. The air suspension apparatus of claim 1,
    wherein the driving information detector further comprises:
    a vehicle speed detector configured to detect the current vehicle speed; and
    a road information provider configured to provide the road condition information.

4. The air suspension apparatus of claim 3, wherein the controller is configured to:
    control the air shutter so that the opening degree of the inner air channel reaches a first predetermined opening degree when the vehicle is in a low-speed driving state in which the detected current vehicle speed is equal to or less than a predetermined speed; and
    control the air shutter so that the opening degree of the inner air channel reaches a second predetermined opening degree set to a value less than the first predetermined opening degree when the vehicle is in a medium or high-speed driving state in which the detected current vehicle speed exceeds the predetermined speed.

5. The air suspension apparatus of claim 3, wherein:
    the road condition information includes information representing a type of the road on which the vehicle is currently driving, wherein the type of the road includes a flat road and a rough road; and
    the road information provider includes a navigation system.

6. The air suspension apparatus of claim 4, wherein the controller is configured to:
    control the air shutter so that the opening degree of the inner air channel of the air shutter reaches the first predetermined opening degree when it is determined that the road on which the vehicle is currently driving is a flat road; and
    control the air shutter so that the opening degree of the inner air channel of the air shutter reaches the second predetermined opening degree set to the value less than the first predetermined opening degree when it is determined that the road on which the vehicle is currently driving is a rough road.

7. The air suspension apparatus of claim 3, wherein:
    the road condition information includes information representing a distance from a preceding vehicle; and
    the road information provider includes a front detector configured to detect the distance from the preceding vehicle.

8. The air suspension apparatus of claim 7, wherein the controller is configured to:
    control the air shutter so that the opening degree of the inner air channel of the air shutter reaches a first predetermined opening degree when the distance from the preceding vehicle is equal to or less than a predetermined distance; and
    control the air shutter so that the opening degree of the inner air channel of the air shutter reaches a second predetermined opening degree set to a value less than the first predetermined opening degree when the distance from the preceding vehicle exceeds the predetermined distance.

9. The air suspension apparatus of claim 1, wherein the air shutter further comprises:
    a motor, wherein the controller is configured to control a driving and a rotation direction of the motor;
    a stationary body installed on the supply path of air from the air tank to the control valve and configured to pass air;

a reducer installed on the stationary body and configured to reduce rotary force of the motor and to transmit the reduced rotary force;
a rotary plate rotatably installed on the stationary body to be rotated by the reduced rotary force; and
a plurality of blades rotatably installed in the stationary body to form an air channel within the stationary body, and configured to adjust an opening degree of the air channel by simultaneously rotating the rotary plate.

10. The air suspension apparatus of claim 9, wherein the stationary body further comprises:
an inlet-side body; and
an outlet-side body combined integrally with the inlet-side body by a connection bracket,
wherein the reducer, the rotary plate, and the blades are disposed between the inlet-side body and the outlet-side body,
wherein an inlet port is connected to the air tube and is configured to supply air from the air tank to the air tube, the inlet port provided in the inlet-side body, and
wherein an outlet port is connected to a supply port of the control valve, the outlet port provided in the outlet-side body.

11. The air suspension apparatus of claim 9, wherein the reducer comprises:
an outer gear mounted on a drive shaft of the motor; and
a gear device configured to:
receive the rotary force of the motor through the outer gear;
reduce the rotary force; and
output the reduced rotary force.

12. The air suspension apparatus of claim 9, wherein:
when the blades are arranged in a circular shape in a circumferential direction on an inner surface of the stationary body, the air channel is formed at a center of circular arrangement of the blades;
the respective blades are rotatably combined with the inner surface of the stationary body;
connection pins formed on the respective blades are inserted into slot holes formed in the rotary plate; and
when the rotary plate is rotated, the connection pins of the respective blades are guided along the corresponding slot holes, and the blades are simultaneously rotated towards the center of the circular arrangement of the blades or simultaneously rotated in an opposite direction depending on a rotation direction of the rotary plate to adjust the opening degree of the air channel.

13. The air suspension apparatus of claim 12, further comprising: air passage holes formed in the rotary plate and configured to pass through the air channel.

* * * * *